US005903427A

United States Patent [19]

Roby

[11] Patent Number: 5,903,427

[45] Date of Patent: *May 11, 1999

[54] ARC CONTAINING DEVICE

[75] Inventor: David Roby, Sydney, Australia

[73] Assignee: ABB Power Transmission Pty Limited, Australia

[ * ] Notice: This patent issued on a continued prosecution application filed under 37 CFR 1.53(d), and is subject to the twenty year patent term provisions of 35 U.S.C. 154(a)(2).

[21] Appl. No.: 08/581,545

[22] PCT Filed: Jul. 18, 1994

[86] PCT No.: PCT/AU94/00403

§ 371 Date: Apr. 3, 1996

§ 102(e) Date: Apr. 3, 1996

[87] PCT Pub. No.: WO95/03643

PCT Pub. Date: Feb. 2, 1995

[30] Foreign Application Priority Data

Jul. 22, 1993 [AU] Australia .............................. PM 0100
Aug. 13, 1993 [AU] Australia .............................. PM 0573

[51] Int. Cl.[6] ...................................................... H02H 1/00

[52] U.S. Cl. ...................... 361/128; 361/117; 174/140 R

[58] Field of Search .................................... 361/117, 118, 361/126, 127, 128, 130, 131, 132, 133, 134, 137, 138; 174/140 R, 141 R, 644, 145, 140 CR

[56] References Cited

U.S. PATENT DOCUMENTS

| | | | |
|---|---|---|---|
| 3,471,632 | 10/1969 | Cox et al. | 174/141 |
| 4,451,813 | 5/1984 | Hirose et al. | 237/17 |
| 4,467,387 | 8/1984 | Bergh et al. | 361/132 |
| 4,667,070 | 5/1987 | Zuckler | 200/144 |
| 4,839,481 | 6/1989 | Nash et al. | 200/144 |

FOREIGN PATENT DOCUMENTS

| | | | |
|---|---|---|---|
| 0012290 | 10/1977 | Australia . | |
| 0133368 | 2/1985 | European Pat. Off. | H01H 33/66 |
| 0185211 | 6/1986 | European Pat. Off. | H01H 33/66 |
| 0759074 | 5/1943 | Germany . | |
| 1088580 | 9/1960 | Germany . | |
| 1483899 | 8/1977 | United Kingdom | H01H 33/04 |

OTHER PUBLICATIONS

Derwent Abstract Accession No. 83–727471/31, SU–A–961015–A, Tomosk Poly, Sep. 23, 1982.

Derwent Soviet Inventions Illustrated, Sec. 2, Electrical, p. 92, Jul., 1971, SU–284129, circulating Electric Arc, Volovik.

*Primary Examiner*—Ronald W. Leja
*Attorney, Agent, or Firm*—Ladas & Parry

[57] ABSTRACT

A device for containing an electrical discharge arc and holding the arc substantially captive until it is extinguished. The device comprises two spaced apart conductor systems (13 and 14) that are connected to points (23 and 24) of different voltage potential in an electrical circuit, so that arc current will flow through and between the conductor systems (13 and 14) in the event of an arc discharge between the conductor systems. The conductor systems are arranged normally to locate about an insulated portion (22) of an electrical apparatus. Each conductor system comprises a conductor element (15 or 16) in the form of an open loop which provides a predominantly unidirectional current path through the associated conductor system (13 or 14), so that any arc which extends between the two conductor systems will be caused to move repeatedly and unidirectionally around the loop in the presence of a force which has a component extending in the direction of the loop and which exists as a consequence of interaction of the arc current with the magnetic field associated with current in the loop.

17 Claims, 7 Drawing Sheets

ARC CONTAINING DEVICE

TECHNICAL FIELD

This invention relates to a device which is suitable for use in containing an electrical discharge arc. The device has been developed primarily for use in power generation-transmission-distribution systems, for example in protecting against the consequences of arcing due to overvoltage induced fault and other conditions, and the invention is hereinafter described in this context. However, it will be understood that the invention does have broader application, that is to any situation in which it is desired that an electrical discharge arc be contained for the purpose of sustaining the arc with minimal erosion of electrodes and/or for holding the arc substantially captive until it is extinguished.

BACKGROUND ART

Electrical discharge arcing may occur in a power transmission system as a consequence of an overvoltage condition arising from a switching event or a lightning strike, as a consequence of breakdown or bridging of insulation between conductors at different potentials and as a consequence of thermal destruction of circuit devices. In some cases arcing is accommodated (for example in use of arcing horns) for the purpose of protecting equipment against overvoltage induced fault currents until such time as the current supply is terminated by operation of circuit breakers, whilst in other cases unpredictable or, at least, unwanted flashover-type arcing occurs in or adjacent to electrical equipment. However, in all cases in which arcing is sustained it may provide a starting point for fires and/or may cause major damage to plant and equipment.

DISCLOSURE OF THE INVENTION

The present invention provides a device which is arranged for containing an electrical discharge arc and which comprises two spaced apart conductor systems, means for maintaining the conductor systems in separated relationship and means for connecting the respective conductor systems to points in an electrical circuit at different voltage potentials whereby, in the event of an arc discharge between the conductor systems, current will flow through and between the conductor systems. At least one of the conductor systems comprises at least one conductor element which is in the form of a loop which is exposed to the other conductor system and which provides a predominantly unidirectional current path whereby any arc which extends between the conductor systems will be caused to move substantially unidirectionally around the loop repeatedly in the presence of a force which has a component extending in the direction of the loop and which exists as a consequence of interaction of the arc current with the magnetic field associated with current in the loop.

In use of the arc containing device, when an arc is established between the conductor systems, current flows into the conductor element and creates an encircling magnetic field. The resultant magnetic field in turn has a component intersecting the direction of the arc current flow, and the interaction of the electric and magnetic components results in the creation of an orthogonal force which acts to induce movement of the arc along and in the direction of the loop. Thus, the arc is caused to rotate around the loop whilst extending between the two conductor systems.

High speed rotation of the arc causes adjacent air turbulence and thereby creates a cooling effect on the arc and adjacent hardware. This cooling effect helps significantly to reduce erosion of the conductor elements. Also, when the device is employed in electrical circuits having a low system voltage the thermal conditions induced by arc rotation may be sufficient to cause a self-extinguishing effect, so that the arc may be extinguished relatively quickly and without there being a need independently to break the current supply.

A further advantage flowing from rotation of the arc is that the arc-to-metal contact is over time spread over a relatively large area, thus reducing further the thermal erosion or concentration of erosion of the conductor systems between which the arc extends.

The arc containing device of the present invention may be employed as a protective device in a power transmission system for the purpose of minimising the effects of overvoltage induced fault conditions and/or for containing arc discharges arising from insulator breakdown and other such faults in particular pieces of electrical apparatus. Thus, the device may be employed as a protective element, either alone or in association with such other circuit protective devices such as surge arresters, or the device may be employed as an integrated part of electrical equipment.

When used as a fault protection device, the arc containing device functions to contain the fault induced arc until such time as system circuit breakers or fuses operate to interrupt the current. The time required to do this and, thus, the operating time-requirement of the device will be dependent upon the system conditions and the duration of fault current permitted by the system, but the episodic operating time requirement of the device will typically be in the order of 0.05 seconds to 30 seconds. Unlike some other types of circuit protecting equipment that suffer spark erosion or total sacrificial destruction under fault conditions, the current containing device of the present invention may be constructed so that it does not suffer significant degradation in use and, thus, may be designed to provide repeatable protection against fault conditions.

The spacing between the conductor systems in the arc containing device will vary with the application of the device and the voltage of the system in which the device is intended to be used. It is envisaged that the device will typically have applications in systems that have voltages within the range 800 kV to 440 V, that is in high voltage transmissions systems down to low voltage remote distribution systems. When used to capture and contain the arc that is expelled from a surge arrester that is suitable for use in a 22 kV system, the spacing between the conductor systems will typically be in the order of 200 to 300 mm in air.

The means for maintaining the conductor systems in separated relationship may comprise insulator elements alone, a semiconductive circuit apparatus such as a surge arrester, an insulated circuit apparatus such as a terminal bushing of a high voltage transformer or any other apparatus or structure that has sufficient impedance normally to maintain the voltage potential between the conductor systems. Thus, the means for maintaining the conductor systems in separated relationship preferably comprises a semiconductive or a non-conductive core about which the conductor systems extend. The core functions to encourage circular movement of the arc around the conductor systems. The conductor systems and, hence, the entire arc containing device may optionally be located within a shroud and, in this circumstance, the shroud itself may be employed to maintain the conductor systems in spaced relationship. The shroud may be formed from an insulating material, a conductive material or an insulating material within a conductive material, depending upon its intended function and other constructional features of the device.

One only of the spaced-apart conductor systems may be employed for establishing the arc rotating force and, in such case, the other conductor system may comprise a substantially flat disc or an annular ring type conductor which does not make provision for a unidirectional current path. However, in a preferred form of the device, both of the conductor systems are constituted by similar conductor elements which provide respective unidirectional current paths.

The or each conductor element that provides a unidirectional current path preferably comprises an open loop conductor element having a free end region which is exposed to the other conductor system and which is located in juxtaposed relationship to an adjacent region of the conductor system of which it forms a part. The unidirectional current path will then be in a direction away from the free end of the open loop; that is, toward a terminal connection from a point of arc current entry into the conductor element. With this arrangement, any arc which extends between the conductor systems will be caused to transfer between the adjacent regions and move around the loop repeatedly aided by the above mentioned force.

The or each conductor system may comprise two or more overlapping open loop conductor elements, each element providing a unidirectional current path to its terminal connection either directly or via a bus connection.

When both of the conductor systems comprise open loop conductor elements, the elements may extend (i.e. be wound) in in the same direction from their respective connector (i.e. terminal) ends to their free ends, particularly when they are close together. Thus, in an arrangement of the invention in which the conductor systems are relatively closely spaced, both conductor systems will be wound in a clockwise sense or, alternatively, both conductor systems will be wound in an anti-clockwise sense, starting from the terminal connectors of the respective systems. However, when the conductor elements are spaced apart by a distance such that the magnetic field associated with one element will not significantly influence the magnetic field associated with the other element, as will mostly be the case, the conductor elements preferably both extend (i.e. are wound) in opposite directions.

The or each conductor element preferably is formed from a brass rod having a circular cross-section but it may alternatively be formed from a rod of magnetisable material.

Depending upon the magnitude of the arc rotating force, the or each open loop conductor element may be wound with slightly less than one complete convolution but preferably is wound as a spiral helix having slightly more than one convolution. The or each open loop conductor element most preferably has a total effective length equal to 1.2 to 2.5 convolutions, although it may be wound with a greater number of convolutions with the object of increasing the magnitude of the arc rotating force. Thus, each conductor element is preferably formed such that its free end overlaps an adjacent portion of the element. With this configuration, as a given portion of the arc moves along the length of the conductor element and tends to move toward the free end region of the conductor element, the arc will transfer from the free end region to the adjacent region of the conductor element, aided by the rotating force, and continue to travel around the loop in a repetitive manner.

The forces within the device may in use cause the free end of the conductor element to close momentarily against the adjacent portion of the element. However, it has been determined that this does not materially affect the operation of the device and it is to be understood that, when reference is made to an open loop conductor element, it is acceptable that poor contact may be established between the adjacent portions of the conductor element, so that a predominantly unidirectional current path is formed. Resistive elements such as insulating elements or semiconductor elements may be employed to maintain the overlapping regions of the conductor element in spaced (open loop) relationship.

Permanent magnets, for dc systems, or magnetically permeable material or electromagnets may be positioned adjacent the or each open loop conductor element for the purpose of enhancing the magnetic field surrounding a given cross-section of the conductor element and, as a consequence, for the purpose of increasing or modifying the rotation inducing force on the arc. The magnets may be incorporated in insulators that are located within and extend longitudinally within the conductor elements.

As stated previously, the arc containing device may be employed independently of other circuit devices and, thus, function solely in the manner of an arcing horn or rod gap. In this application the device may be used as an overvoltage protector device. Additionally and/or alternatively, the device may be used as an integral part of an electrical apparatus, for example a high voltage transformer bushing insulator, for capturing power arcing which occurs as a consequence of equipment failure or flashover and containing such arcing until it is extinguished by actuation of current isolating apparatus.

In yet another application of the arc containing device, such device might be adapted to function in parallel with a surge arrester, so that the device will take-over from the arrester and establish its own arc under a circuit condition that approaches the limiting operating condition for the arrester. Thus, the device may be used as an adjunct to a surge arrester to protect the arrester against greater-than-predicted surge current conditions. In this application the device may be employed to make reusable a surge arrester that otherwise would be sacrificed in protecting other circuit apparatus.

The arc containing device may also be integrated in electrical equipment which normally include corona rings or grading rings, with the loop-type conductor elements being employed as the corona or grading rings. In this application, the arc containing device will perform a three-fold function of protecting against overvoltage induced fault conditions, protecting against arcing which originates from equipment failure or flashover by capturing and containing the arc, and providing voltage grading along the length of the insulator in the same manner as conventional corona or grading rings.

The invention will be more fully understood from the following description of a preferred embodiment of an arc containing device which is integrated in a surge arrester. The description is provided with reference to the accompanying drawings.

MODE FOR CARRYING OUT THE INVENTION

Figure 1:
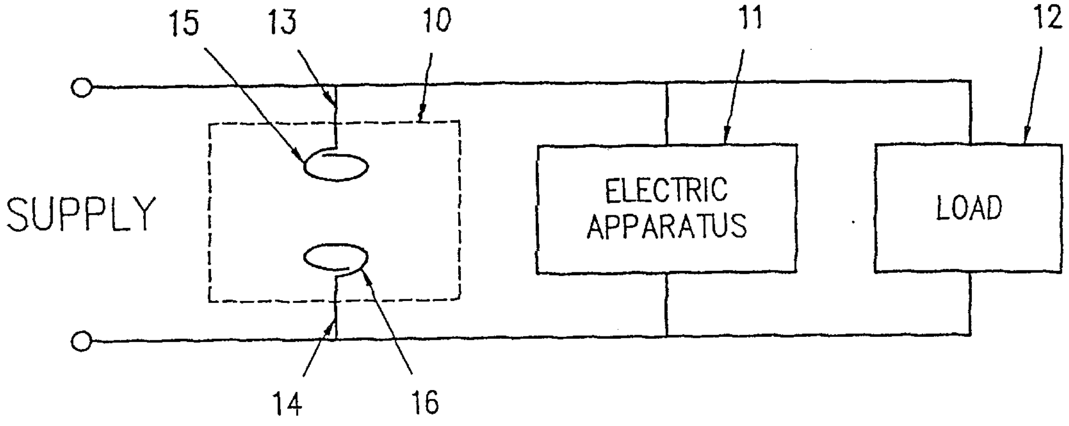
FIG. 1 shows an arc containing device in diagrammatic form located in circuit with an electrical apparatus.

As shown diagrammatically in FIG. 1, an arc containing device 10 is located in circuit with an electrical apparatus 11, for example a transformer. The device 10 when located separately from the apparatus 11 may be employed as a surge diverter for protecting the apparatus and a distant load 12 from overvoltage conditions in the transmission system extending between the supply and the device 10. Alternatively, if the arc containing device 10 is mounted in close proximity to or is formed as an integral part of the apparatus 11, the device may perform the dual functions of protecting the device against overvoltage surges and capturing any arc that arises from equipment failure or flashover between high and low voltage regions of the apparatus.

Figure 2:
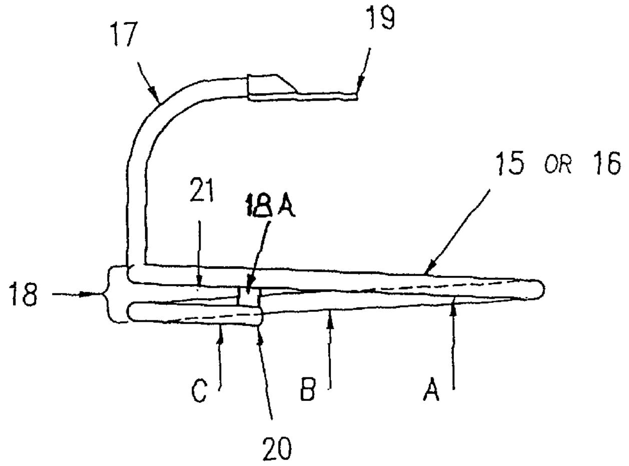
FIG. 2 shows a diagrammatic representation of one open loop conductor element of the arc containing device of FIG. 1, FIGS. 3A and 3B show front and side elevation views respectively of a surge arrester which includes as an integral part a surrounding arc containing device.

The arc containing device 10 as illustrated comprises two spaced apart conductor systems 13 and 14 which are constituted by open loop conductor elements 15 and 16, one of which is shown on an enlarged scale in FIG. 2. Each conductor element 15 or 16 is formed from metal wire (for example brass wire) which is wound with a spiral or, as shown, a vertically extending portion 17 and a following helical portion 18 which has approximately 1.2 convolutions. The turns of the helix do not contact one another and may, in fact, be separated by insulating or semiconductor elements 18A placed between the overlapping portions of the conductor elements. One end 19 of each conductor element (i.e., a terminal end of the element) is connected to one side of the supply, and the complete device 10 is connected across the supply such that it is exposed to the full system voltage.

The other, free end 20 of the conductor element 15 locates below the adjacent convolution of the conductor element in the case of the upper conductor system 13 and locates above the adjacent convolution in the case of the lower conductor system 14. Thus, the free end portions 20 of the two, upper and lower, conductor elements 15 and 16 extend toward one another and they are exposed to one another. The end regions 20 of the two spaced apart conductor elements 15 and 16 tend to shield the adjacent portions 21 of the conductor elements and provide preferred regions of contact for any arc extending between the upper and lower conductor systems.

In operation of the device described thus far, if it is assumed that an initial arc strike occurs at point A on the conductor element shown in FIG. 2 and the arc is sustained, the arc will tend to move along the conductor element in the direction toward the free end 20. This occurs because arc current will flow into the conductor element and move unidirectionally toward the terminal end 19 of the conductor element. Such current flow will give rise to an encircling magnetic field (i.e. one which encircles the longitudinal axis of the conductor element) and the magnetic field will have a component that intersects the direction of arc current flow into the conductor element. A resultant (orthogonal) force is thereby created as a consequence of the interaction of the magnetic field and the arc current and the force will act to move the arc in the direction from positions A to B to C. In so doing the force causes the arc to transfer from the lower convolution of the loop to the upper convolution and, thus, to transfer from the free end 20 of the conductor element to the adjacent region of the conductor element. This transfer is aided by the geometry of the open end of the conductor element and the close juxtaposition of the adjacent portions of the conductor element. The arc is caused to move repetitively around the loop from points A to B to C to A etc, that is around the overlapping convolutions 18 of the conductor element, and the arc tends to be held captive within the bounds of the circumference of the loop.

In the case of an arc striking initially in the region between the spiral portion 17 and the terminal end 19, the geometry or structure of this region may be arranged so that the arc is magnetically driven away from the end 19 in the direction toward region 17, from which it will transfer to the overlapping region 18 and continue toward point C, from which it will move repeatedly around the loop from C to A to B to C etc.

Figure 3B:
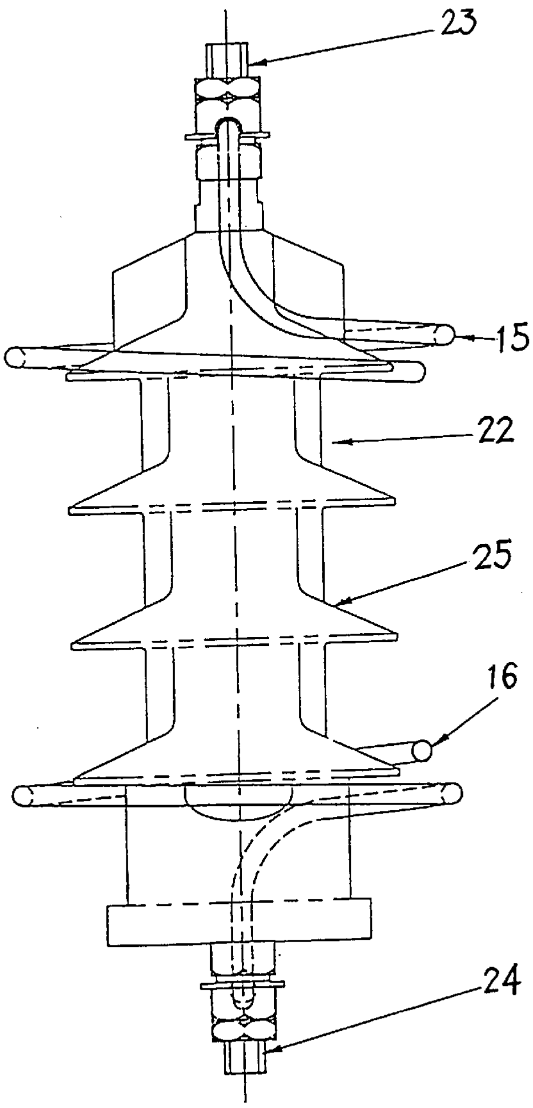
Figure 3A:
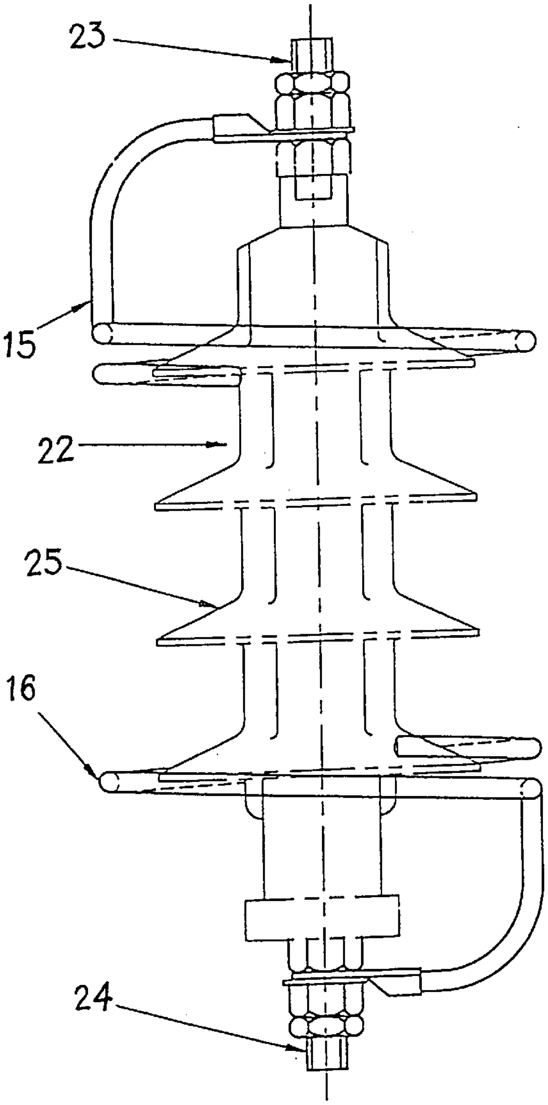
Figure 4:
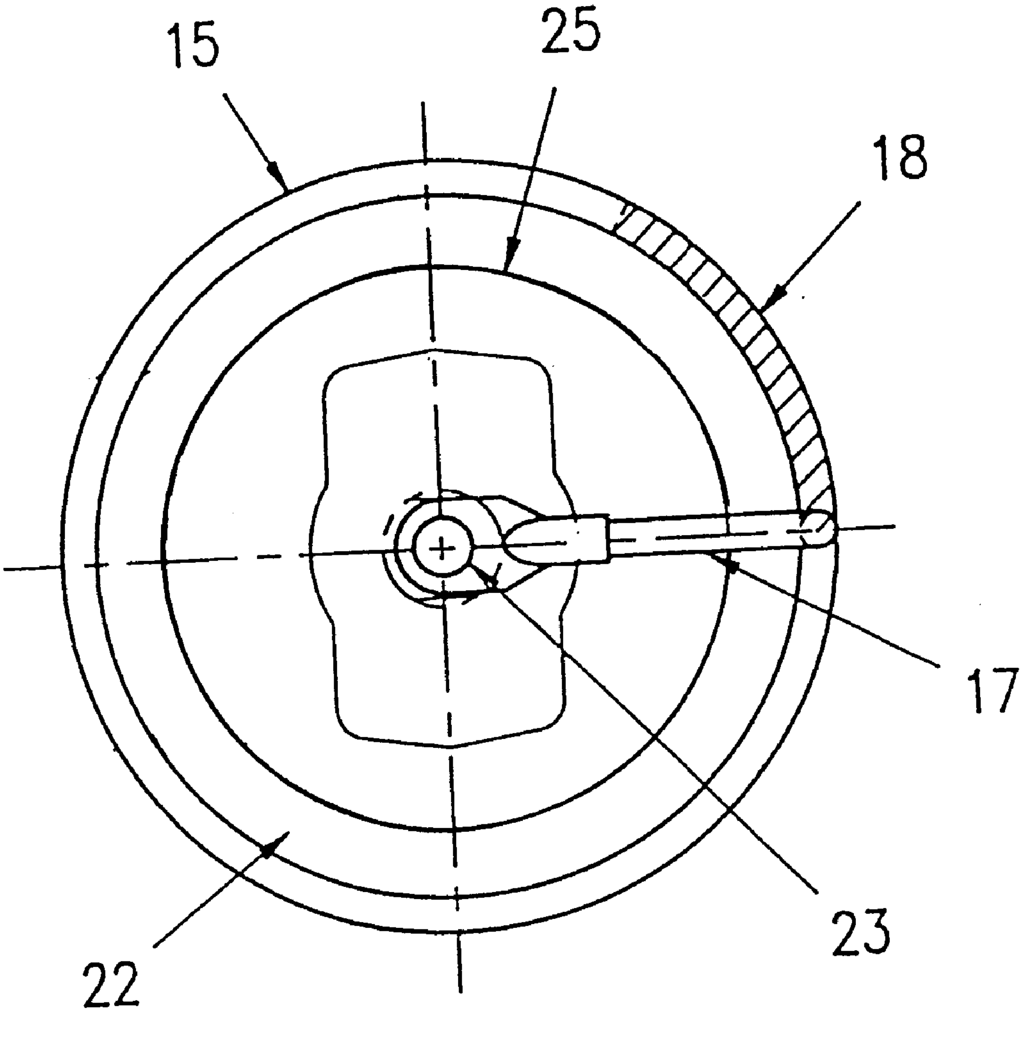
FIG. 4 shows a plan view of the surge arrester as illustrated in FIGS. 3A and 3B.

FIGS. 3A, 3B and 4 show a surge arrester which includes as an integral part an arc containing device of the type previously described. The surge arrester 22 is constructed in a conventional manner and has a plurality of varistor devices (not shown) connected in series between terminal studs 23 and 24. A major portion of the surge arrester is encapsulated within insulating material which is formed as a plurality of sheds 25, and conductor elements 15 and 16 are connected mechanically and electrically to the studs at each end of the surge arrester.

Figure 5:
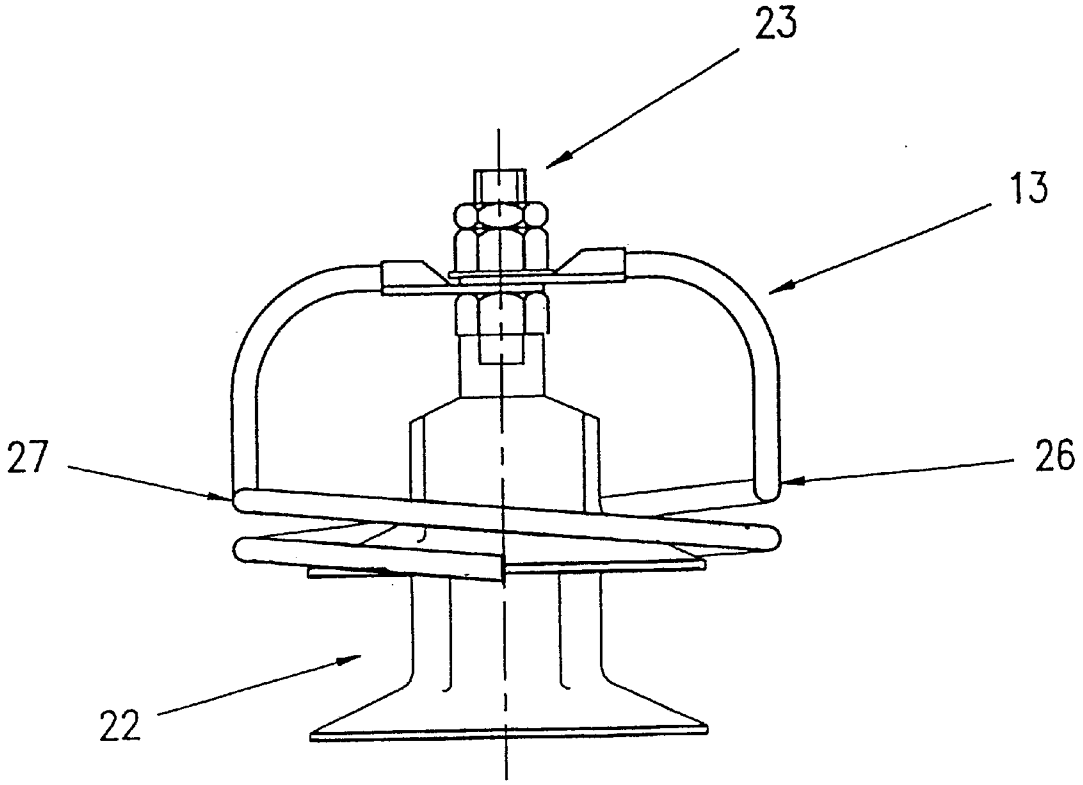
FIG. 5 shows an elevation view of an upper portion of a surge arrester to which a conductor system, which comprises two open loop conductor elements, is mounted.

FIG. 5 shows an elevation view of the upper portion of the surge arrester 22 which is illustrated in FIG. 3 but with a modified conductor system 13. In this case the conductor system 13 (and its lower counterpart 14) comprises two open loop conductor elements 26 and 27, both of which have the same form and construction and both of which are connected to the terminal stud 23 of the surge arrester. With this arrangement a given point on an arc which contacts the conductor system 13 (and the corresponding lower conductor system 14) will transfer between the elements 26 and 27 as the arc is caused to rotate around the conductor elements. Each of the elements 26 and 27 has a helical form composed of less than one convolution but the overlapping arrangement of the two elements 26 and 27 creates the effect of more than one convolution, with both elements being wound in the same sense so that the arc will transfer from the free end of one element to an adjacent portion of the other element and so continue rotating unidirectionally around the loop.

Figure 6:
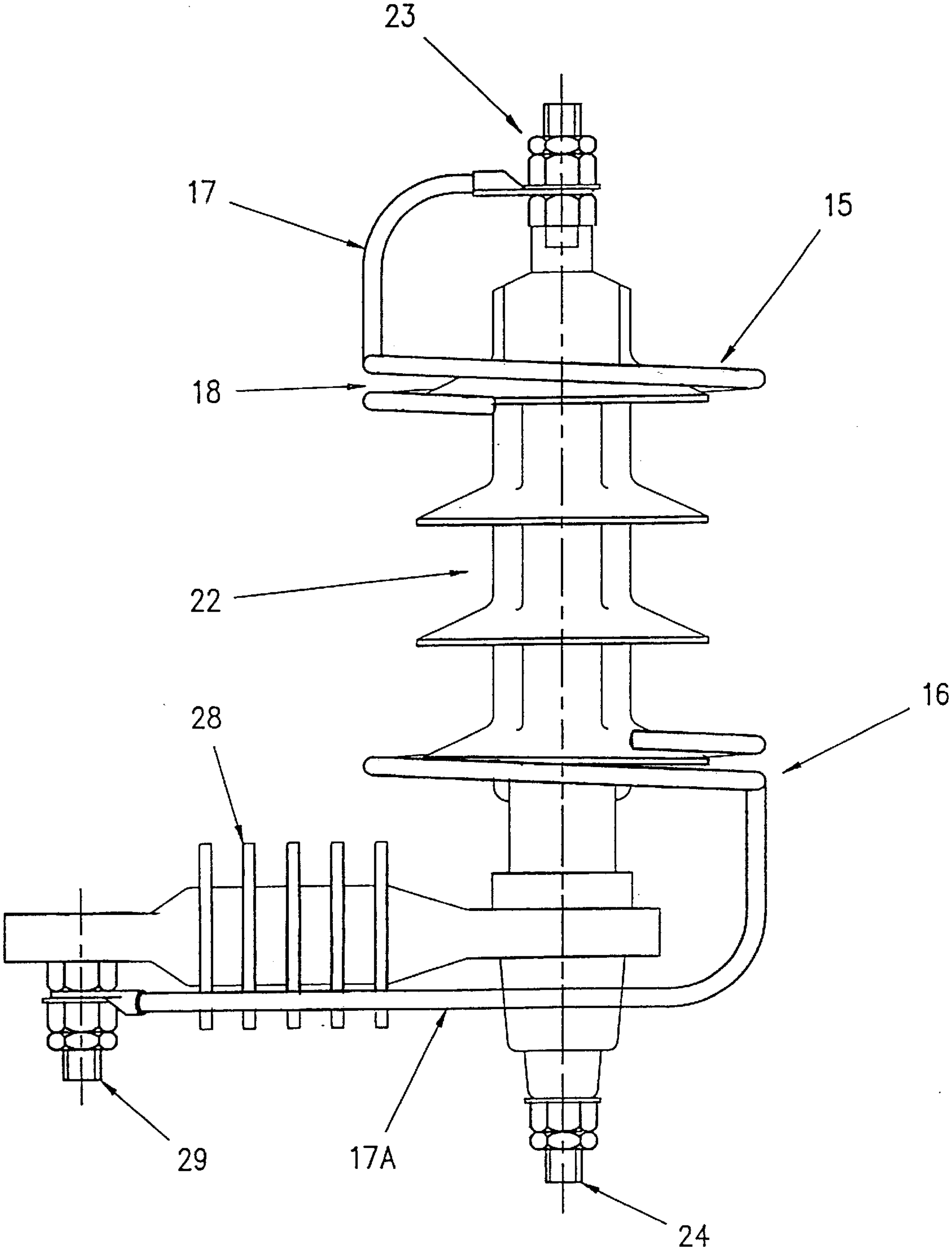
FIG. 6 shows an elevation view of a surge arrester, which incorporates a surrounding arc containing device, mounted to an insulating bracket.

FIG. 6 of the drawings shows a surge arrester 22 and a surrounding arc containing device 10 (as shown in FIG. 1) mounted to an insulating bracket 28. In this case the open loop conductor element 15 is connected to the upper terminal stud 23 of the surge arrester and the lower conductor element 16 is connected by way of a conductor limb 17A to a terminal stud 29 at what normally would be the earthed end of the insulating bracket 28. A flexible conductor (not shown) would normally connect the lower terminal stud 24 of the arrester 22 to the terminal stud 29 of the insulating bracket 28, with provision being made to effect disconnection of the flexible conductor.

Figure 7:
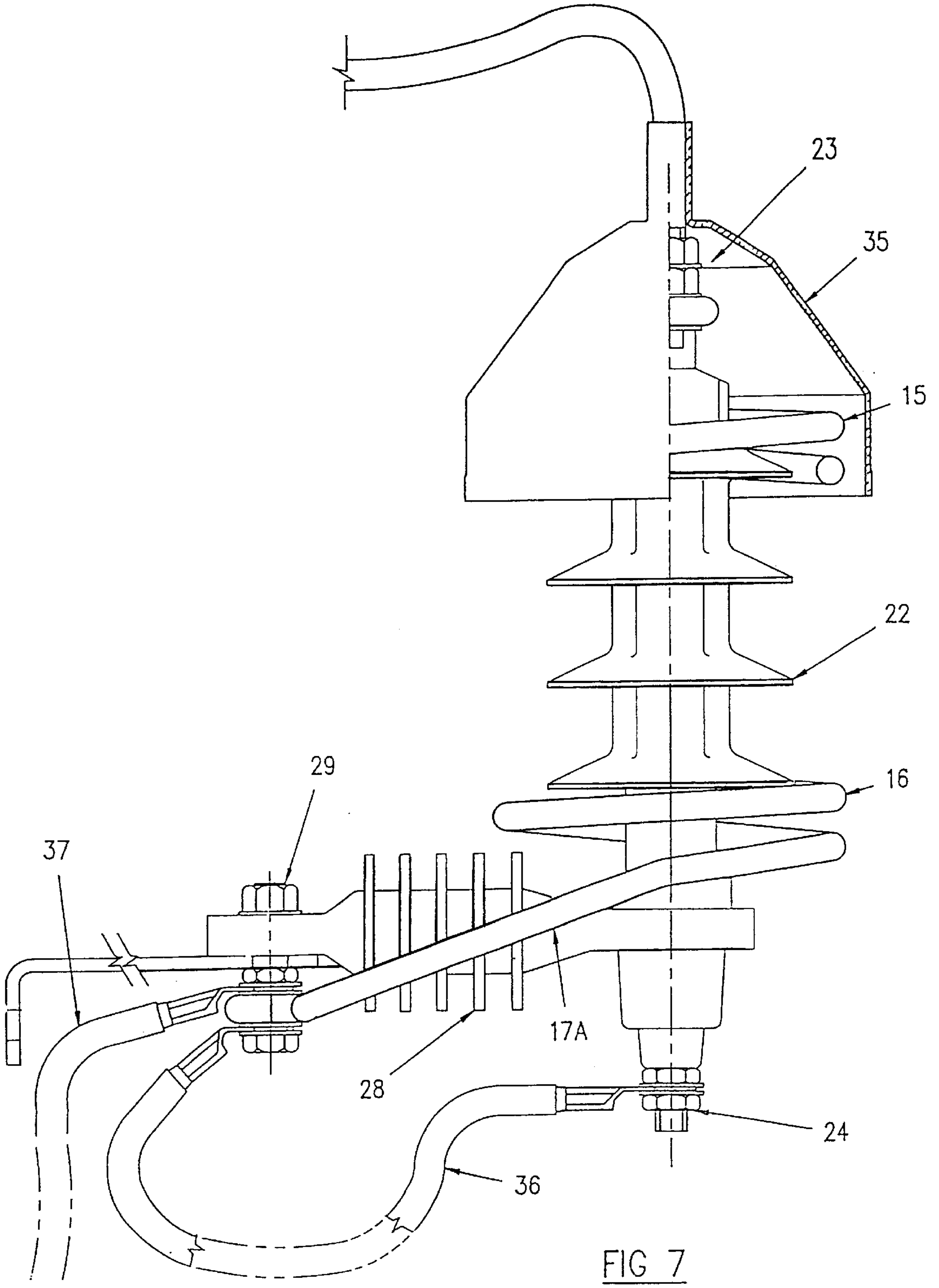
FIG. 7 shows a modified form of the surge arrester which is illustrated in FIG. 6.

FIG. 7 shows a surge arrester 22 which is similar to that shown in FIG. 6 but which includes an upper protective shroud 35, a lower conductor 36 that connects the disconnector device terminal stud 24 to earth terminal stud 29, and an earthing connector 37.

Figure 8:
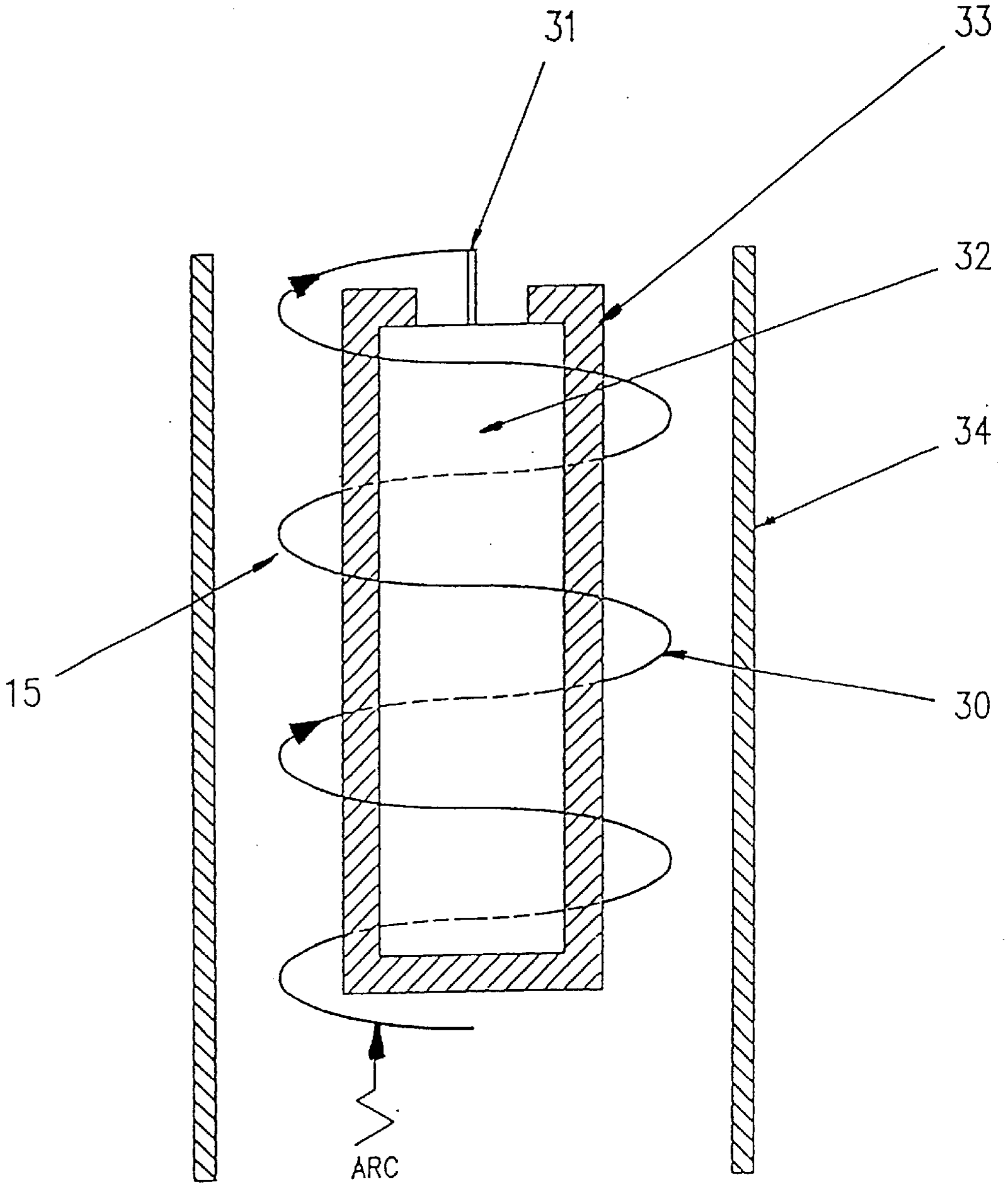
FIG. 8 shows diagrammatically an elevation view of a multi-convolution open loop conductor element mounted about an encased magnetically permeable material and within a shroud.

FIG. 8 of the drawings shows in a diagrammatic way an upper open loop conductor element 15 in the form of a helix 30 having multiple convolutions. In this case, as in the previous cases, the helix is formed from a wire-like conductive material and is connected to an electrical termination 31. The helix is wound about a magnetically permeable material 32 which is encased within an insulating housing 33, and the major part of the conductor element 15 is contained within a shroud 34.

Other variations and modifications may be made in respect of the invention as above described and as defined in the following claims.

I claim:

1. A device for containing an electrical discharge arc, said device comprising two spaced apart conductor systems that are exposed to one another; means for connecting the respective conductor systems to electrically conductive connecting points in an electrical circuit at different voltage potentials whereby, in the event of an arc discharge between the conductor systems, current will flow through and between the conductor systems; and a core composed of an insulating material extending between the conductor systems; wherein at least one of the conductor systems comprises at least one conductor element which is in the form of an open loop which surrounds the core and which provides a predominantly unidirectional path for current flow whereby any arc which extends between the conductor systems will be caused to move substantially unidirectional around the loop repeatedly in the presence of a force which has a component extending along the loop and which exits as a consequence of interaction of the arc current with a magnetic field associated with current in the loop, the conductor element being arranged such that a portion of its loop overlaps a further portion of the conductor element to thereby shield the connecting means associated with the conductor system, of which the conductor element forms a part, from arcing that extends between the conductor systems.

2. The device as claimed in claim 1 wherein the portion of the conductor element loop that overlaps said further portion of the conductor element comprises a free end region, and said free end region is exposed to the other conductor system.

3. The device as claimed in claim 1 wherein each of the conductor systems comprises at least one said conductor element that is in the form of an open loop which surrounds the core and provides a predominantly unidirectional path for current flow.

4. The device as claimed in claim 3 wherein the conductor element of each of the conductor systems is arranged such that the portion of its loop, which overlaps the further portion of the conduct element and shields the connecting means from arcing that extends between the conductor systems, comprises a free end region, and said free end region of the conductor element of each of the conductor systems is exposed to the free end region of the conductor element of the other conductor system.

5. The device as claimed in claim 4 wherein each open loop conductor element is formed in part as a helix having at least 1.2 convolutions.

6. The device as claimed in claim 5 wherein resistive elements are mounted respectively to the open loop conductor elements and are employed to maintain overlapping regions of the conductor elements in spaced relationship.

7. The device as claimed in claim 4 wherein the conductor element of each said conductor system is formed in part as a helix having at least 1.2 convolutions and wherein the conductor element has a terminal end which is remote from the free end of the conductor element and which is arranged for connection to the electrical circuit by way of the connecting means.

8. The device as claimed in claim 7 wherein the conductor elements of the respective conductor systems are wound in the same directional sense from the respective terminal ends to the respective free ends thereof.

9. The device as claimed in claim 7 wherein the conductor elements of the respective conductor systems are wound in mutually opposite directional senses from their respective terminal ends to the free ends thereof.

10. The device as claimed in claim 4 wherein each open loop conductor element is formed as a spiral form helix having an effective length equal to 1.2 to 2.5 convolutions.

11. The device as claimed in claim 1 wherein the conductor element is formed from a rod of non-magnetisable material.

12. The device as claimed in claim 1 wherein the core forms a part of the means for maintaining the conductor systems in separated relationship.

13. The device as claimed in claim 1 wherein the means for maintaining the conductor systems in separated relationship comprises an electrical apparatus having an insulated portion which forms the core.

14. The device as claimed in claim 1 wherein the means for maintaining the conductor systems in separated relationship comprises an electrical apparatus which is constituted at least in part by semiconductor elements which form the core.

15. The device as claimed in claim 14 wherein the electrical apparatus comprises a surge arrester.

16. The device as claimed in claim 1 wherein at least one of the conductor systems is located within a shroud.

17. A device for containing an electrical discharge arc, said device comprising two spaced apart conductor systems that are exposed to one another; means for connecting the respective conductor systems to electrically conductive connecting points in an electrical circuit at different voltage potentials whereby, in the event of an arc discharge between the conductor systems, current will flow through and between the conductor systems; and a core composed of an insulating material extending between the conductor systems; wherein at least one of the conductor systems comprises at least two open loop conductor elements which surround the core, wherein each conductor element has less than one convolution, wherein the conductor elements are arranged in overlapping relationship whereby they combine to create the effect of more than one convolution, and wherein the conductor elements provide a predominantly unidirectional path for current flow whereby any arc which extends between the conductor systems will be caused to move substantially unidirectional around the loop repeatedly in the presence of a force which has a component extending along the loop and which exists as a consequence of interaction of the arc current with a magnetic field associated with current in the loop, the conductor element being arranged such that a portion of its loop shields the connecting means associated with the conductor system, of which the conductor element forms a part, from arcing that extends between the conductor systems.

* * * * *